Oct. 12, 1954
J. SUNNEN
2,691,210
VALVE REMOVER
Filed May 22, 1948
3 Sheets-Sheet 1
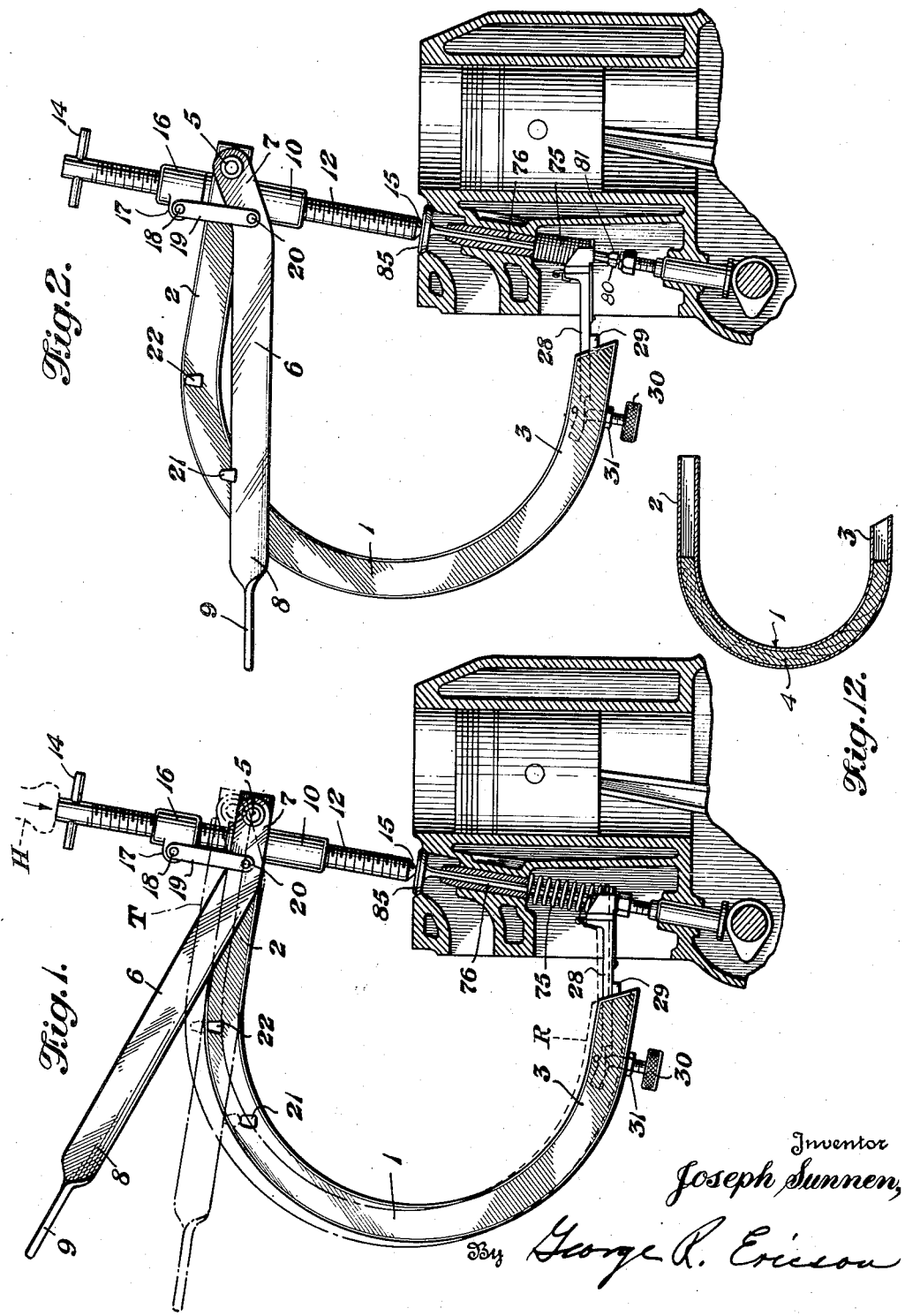

Oct. 12, 1954

J. SUNNEN 2,691,210

VALVE REMOVER

Filed May 22, 1948

Inventor
Joseph Sunnen,
By George R. Ericson

Oct. 12, 1954
J. SUNNEN
2,691,210
VALVE REMOVER
Filed May 22, 1948
3 Sheets-Sheet 3
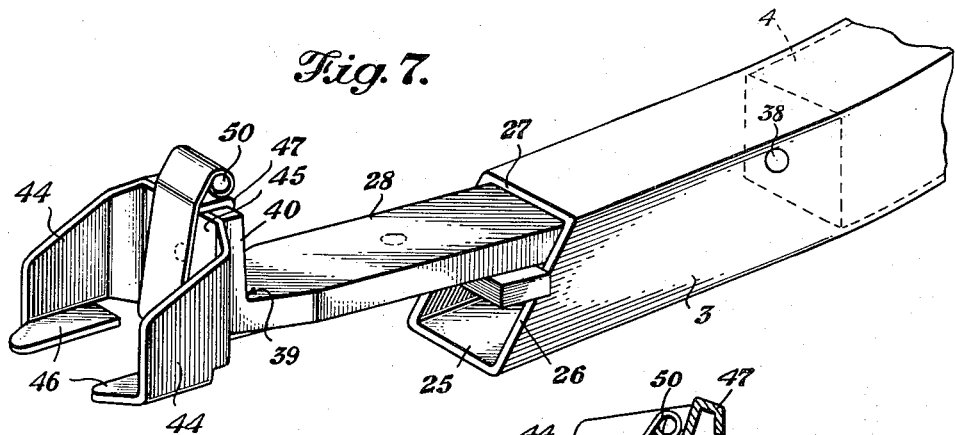
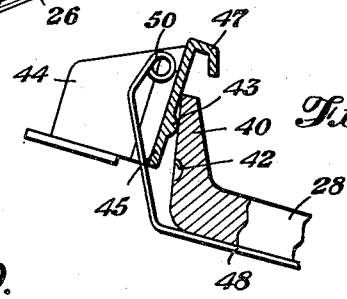
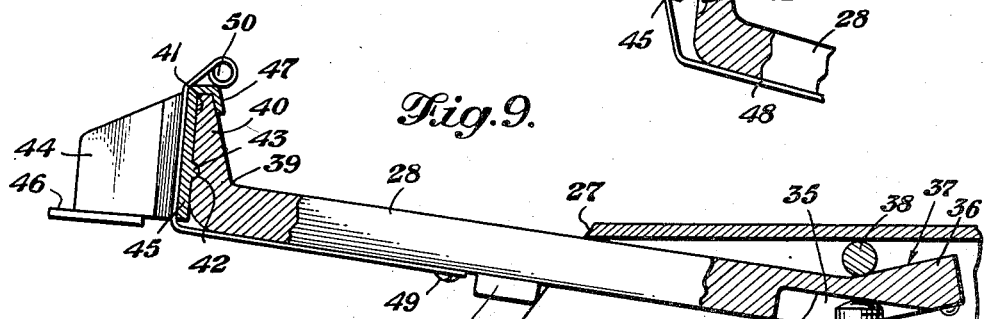
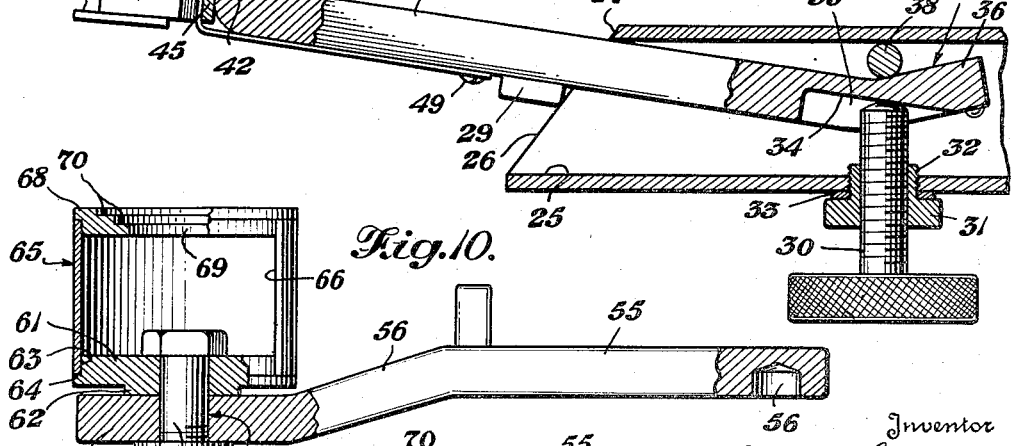
Inventor
Joseph Sunnen,
By George R. Ericson Patented Oct. 12, 1954

2,691,210

UNITED STATES PATENT OFFICE 2,691,210

VALVE REMOVER

Joseph Sunnen, Clayton, Mo.

Application May 22, 1948, Serial No. 28,715

6 Claims. (Cl. 29—219)

This invention relates to valve spring lifters of that type embodying a C-frame.

One of the objects of this invention is to provide a C-frame valve spring lifter wherein the adjustable parts can be preset so that an entire set of valve springs can be removed without adjustment of the several parts.

Another object of this invention is to provide a valve spring lifter of the type referred to above in which the top of the frame is provided with a work engaging screw, the screw and the adjacent portion of the frame being adjustable to permit the application of force in a step by step manner requisite and incidental to the sequential operations embodied in the use of the device.

Another object of this invention is the provision of a hand-operated spring supporting arm which is adapted to be retained in a fixed position during removal of a spring, but which is capable of being operated independent of the main operating mechanism, to lower the compressed spring over the locking elements.

A further object of the invention is to provide a spring supporting arm at the base of the C-frame incorporating a structure which will result in a projection of this arm from the frame during certain operations to provide for a swinging movement of the C-frame on its pivotal support upon a variation in the tension of the structure.

A further object of the invention is to provide a C-frame spring remover and replacer in which tension can be applied to the C-frame for developing impact forces to cause a rupture of any elements which may have a tendency to stick and which must be released to permit removal of the spring.

Still another object is a provision of a C-frame spring remover assembly in which different tensions can be provided for the C-frame to facilitate various operations present in the removal and replacement of a valve spring.

Another object is the provision of a removable spring engaging element whereby the valve lifter of this invention may be suitably adapted for use in connection with removal of springs of different types from the various types of valve assemblies used in the internal combustion art.

Other objects of this invention will more clearly hereinafter appear by reference to the accompanying drawings and specification wherein like characters of reference designate corresponding parts throughout the several views, in which:

Fig. 1 is a side elevation showing the invention applied to a valve assembly, with the initial adjustment of the C-frame preparatory to removal of a valve spring illustrated in full line and its second position in the removal of a valve spring shown in dotted line;

Fig. 2 is a similar view showing the spring removing C-frame adjusted to its third position in the removal of a valve spring;

Fig. 7 is a perspective view showing one form of valve spring engaging attachment in position at the end of the C-frame;

Fig. 8 is a vertical sectional view showing the valve spring retainer engaging attachment partly removed;

Fig. 9 is a longitudinal sectional view showing the hand actuated valve spring engaging attachment shifted to its upper position;

Fig. 10 is a side elevation partly in section showing a modified form of valve spring retainer engaging cup;

Fig. 11 is a perspective view of this modified structure; and

Fig. 12 is a sectional view of the C-frame, showing the wood filler in position.

Figure 3:
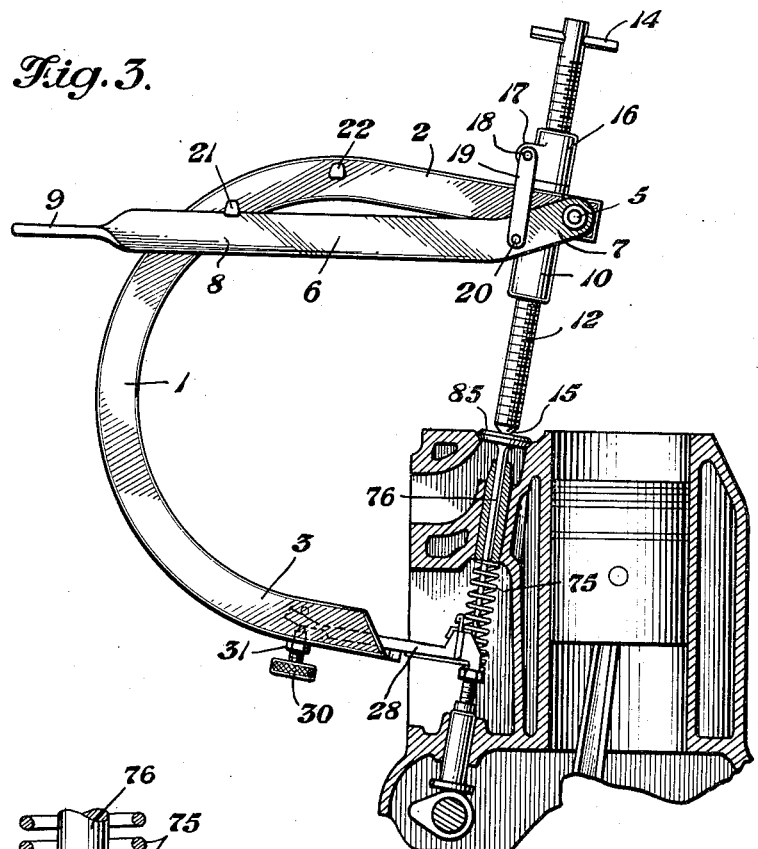
Fig. 3 is a similar view showing the hand adjustable spring engaging element shifted to its lower position after insertion of the spring lock.

Referring particularly to Figures 1, 2 and 3 of the drawings, the main frame of the present valve spring remover is shown to be of conventional C-type, this frame being sufficiently resilient to permit relative shifting of the free ends under the application of pressure from a lever mechanism to be hereinafter described. This C-frame is tubular in construction and in the present development substantially square in cross section. The C-frame is indicated by reference character 1 with its extremities indicated at 2 and 3. By reference to Fig. 12 it will be noted that the hollow tubular structure of the C-frame contains a filler 4, preferably of wood with the grain running transverse to the longitudinal length of the tube. In forming the tube, the filler 4 is forced into a straight piece of tubing so that the filler structure will snugly engage each of the inner walls thereof throughout that portion which may be subjected to bending stresses, and when the filler has been so inserted the tube is bent to C-form with its end portions 2 and 3 substantially parallel. By the use of the filler 4, distortion of the walls of the tube during shaping and bending is prevented, these walls being retained by the filler in their initial parallel relation.

The upper arm 2 of the C-frame is provided with a pivot pin 5 which extends through the two side walls of the tube and projects beyond one of these side walls a sufficient distance to form a pivotal mounting for the angular lever 6, this lever including the upwardly extending pivoted end portion 7 and the elongated portion 8, which latter is twisted at its outer extremity to lie horizontal to provide a handle structure 9 to facilitate the operation of the device. A tubular guide 10 extends perpendicularly through the upper and lower walls of the upper arm 2 of the C-frame and is fixed to these walls by welding or other means so that this tubular guide 10 is substantially integral with the upper arm of the C-frame structure. Both the upper and lower arm extremities 2 and 3 are free from the filler insert 4, it being understood that this filler 4 is only used where a bending operation is to be made of the tube structure. Extending through the tubular guide 10 is an elongated screw 12, this screw 12 having an operating handle 14 at its upper end and a reduced contact extremity 15 at its lower end. The screw 12 is of such a diameter as to move freely within the guide 10 carried at the upper end portion of the C-frame. Threaded on the screw 12 above the guide 10 is a collar 16. The collar 16 has a laterally projecting boss 17 through which extends a pin 18 to form a pivot for one end of a link 19, which link is pivotally connected at its other end at 20 to the portion 7 of the lever 6. By this arrangement a downward movement of the outer end of lever 6 will cause a downward movement of the screw 12 with respect to the arm 2 or if the end of the screw 12 is resting on the valve, it will, of course, cause an upward movement of the arm 2 with respect to the screw. Projecting from the side face of the upper arm 2 of the C-frame are hooks or projections 21 and 22, the purpose of which will be described hereinafter.

The lower free extremity or arm 3 of the tubular C-frame 1 is provided with a lower projecting surface 25 formed by rearwardly shearing the side faces 26 and the top face 27 at a suitable angle (see Fig. 9). The shelf or face 25 functions to form a support for the arm 28 of the valve spring engaging member when in a lowered position, while the inclined faces 26 formed by shearing the side walls of the tube rearwardly form a cam surface for cooperation with the slide 29 on arm 28 during the adjustment of the arm under thrust of the thumb screw 30. The thumb screw 30 extends through a bushing 31 threaded at 32 into the lower wall 25 of the arm 3. A lock washer 33 holds the bushing 31 in fixed position, this bushing being internally threaded to receive the thumb screw 30 and to permit its vertical movement for the purpose of engaging a longitudinally extending, flat surface 34 formed by recessing the lower side of the inner end of the arm 28 at 35. The inner end of the arm 28 is also provided with an angular extremity 36 which provides an upper and opposite, longitudinal, flat surface 37 which is inclined with respect to surface 34 thereby to form a wedge therewith, and which coacts with a fixed reactance element in the form of a round pin 38 upon movement of the thumb screw 30 to cause a longitudinal sliding movement of the wedge and arm 28.

It is to be noted that the longitudinal center line of the wedge, that is, the line bisecting the included angle between its surfaces 34—37, is arranged at an angle with arm 28 so that, even when arm 28 has been swung clockwise to its upper limited position, as shown in Fig. 9, the wedge will not have rotated sufficiently to bring its longitudinal center line to a horizontal position in which it is perpendicular to the vertical line passing through the fixed and adjustable members 38 and 30 respectively. Due to this arrangement, a substantial rotational as well as sliding movement is imparted to the wedge and arm as the screw 30 is adjusted. This, of course, permits the arm to be moved upward much more easily, particularly if the included angle between the wedge surfaces 34—37 is small. Obviously, when the horizontal center line of the wedge is perpendicular to the line connecting the points of contact of elements 30 and 38, only sliding motion will be imparted.

If, when the arm is in an upward position, a considerable force is applied downwardly to the outer end of the arm 28, as by a compressed automative valve spring, it will be seen that this force is resisted at the point of engagement of the follower 29 with cam surface 26. The reaction of the cam surface 26 provides a pivot support at this point about which rotation of the arm 28 is urged by the valve spring force, but this rotation of the arm is resisted by the rigid fixed reaction pin 38. This rotational force being cancelled out, the spring force can now be considered as being moved inwardly and applied downwardly to the arm at its point of contact with the cam surface 26, tending to push the arm downward along the inclined surface. But, in order to move downward, the arm must obviously move outward, and this outward movement is resisted by engagement of the wedge surfaces 34—37 with the pin 38 and screw 30, so that adjustment of screw 30 downward controls the downward movement of the arm.

It is to be further noted that the follower 29 is positioned with relation to the wedge surfaces 34 and 37 in such manner that a line drawn through the point of contact of follower 29 and cam surface 26 and through the apex of the wedge substantially bisects the included angle between these surfaces so as to avoid any binding or locking action. Also, because of this arrangement, no rotational moment is set up about the point of contact of follower 29 which would increase the outward pull on the wedge so that, insofar as the outward pull of the wedge is concerned, the downward valve spring force, as before stated, can be considered as acting downward on the arm at the pivot point 29—26. By making the angle of the inclined plane 26 approximately as shown, which is in the order of 50° to the horizontal, a substantial force component acting normal to the inclined plane results, which component sets up considerable frictional drag between the follower 29 and surface 26. Also, the rotational force resisted by pin 38 results in considerable frictional drag between pin 38 and wedge surface 37. This friction, of course, substantially reduces the net outwardly acting component, tending to pull the wedge outward, the result being substantially reduced stress on the thumb screw and a lighter, more sensitive control of the valve spring release.

In the illustrated embodiment, Fig. 9, the screw 30 and reaction pin 38 are arranged vertically and the direction of adjustment of screw 30 is vertical, which results in the desired rotational movement of arm 28 with respect to the angle of the inclined plane and within the limits of travel of the arm. It is to be understood, however, that screw 30 may be moved toward the left with respect to pin 38 in Fig. 9, or the angle of direction of adjustment of screw 30 may be varied to obtain more or less rotational movement per increment of movement of screw 30 without departing from the invention.

The outer end of the arm 28 is bent upwardly at 39 to provide the angular extremity 40, the outer face of which lies in a plane substantially vertical to the plane of arm 28. This flat end surface 41 is formed with a transverse groove or slot 42 for receiving a rib 43 formed on the vertical face of end wall 45 of the spring cup. The spring cup is formed as shown more clearly in Figs. 7, 8 and 9 and includes side walls 44, end wall 45, horizontal inner spaced lips 46 and hook member 47, the latter being adapted to seat and be supported by the upper extremity of the angular projection 40 formed at the outer extremity of the bar 28. For preventing the displacement of the spring cup or holder, a spring clip is provided, this spring clip including an elongated body portion 48 fastened by a screw or other means 49 to the lower face of the bar 28. The outer free end of the body 48 of the clip member extends beyond the end of the angular projection 40 a sufficient distance to permit the reception of the end wall 45 of the spring cup. The upper extremity of the spring clip is bent to overlie the upper hook portion 47 of the spring receiving cup and terminates in an inwardly turned loop 50, which due to the resiliency of the spring structure of the clip exerts a force downwardly and inwardly of the cup to lock the same on the angular projection 40 of the arm 28. Due to the fact that the end portion of the clip 50 is curled downwardly and upwardly away from the hook 47 there is no binding action when the spring cup or support is released from engagement with the end of the arm 28, the separation of the cup and the arm being clearly shown in Fig. 8. In this figure the cup is shown after it has been shifted to release the projection 43 from the recess 42 and the extremity of the clip is shifted outwardly to permit the passage of the hook member 47.

It will be noted that the spring cup or spring lifting element shown in Figs. 7, 8 and 9 is stamped or otherwise formed from a single piece of material suitably shaped by the usual means to provide the side walls 44, the hook 47, and the spring engaging lips or extensions 46. In Figs. 10 and 11 a modification of this spring support or receiving cup is shown, this modification of the cup also embodying the use of a different type of arm more suitably adapted for use in an engine of a Cadillac automobile. In the modification of Figs. 10 and 11, the free arm is formed with a shank portion 55 having a recess at its inner extremity 56 for receiving the inner end of the thumb screw 30. The forward shank of the arm 55 is bent downwardly at an angle 56 and then horizontally at its outer extremity 57, which extremity is drilled vertically at 58 to receive the bolt 59 secured in position by the nut and washer 60, which bolt secures the base 61 of the modified spring cup. The base of the spring cup of Figs. 10 and 11 is formed as a relatively thick disc 61 with an annular central depending boss 62 at its lower face, this boss being centrally drilled to receive the bolt 59 so that the structure can be clamped to the arm extremity 57. The outer peripheral face of the disc-like base member 61 is formed with an annular groove or recess 63 defined at its lower face by the shoulder 64 to receive the tubular cup 65, the lower face of which rests on the shoulder 64. A portion of the wall of the tubular cup 65 is cut away at 66 as more clearly shown in Fig. 11 to provide an opening to permit access to the interior of the cup. Seated at the upper end of the cylindrical cup 65 is the spring lock engaging disc 68 formed with a central opening 69 and stepped shoulders 70 for receiving the base of the spring lock or retainer as shown at 71 in dotted lines. By having the stepped structure receding outwardly and upwardly from the opening 69, it will be apparent to one skilled in the art that spring retainers of different diameter may be received by the structure.

As previously stated the present development is designed for removing the compression spring 75 from the valve stem 76, this spring being supported at its lower end by the conventional annular spring retainer 71 which includes a collar 78 which embraces the valve stem upwardly of its lower end, an enlarged annular lock chamber 79 and the bottom outwardly projecting flange 77 upon which the lower end of the spring rests. In the annular recess, formed by the enlarged wall portion 79 of the spring seat element, are arranged the lock elements 80 and 81, these elements being as usual companion structures and including inwardly projecting aligned annular beads 82 which seat in annular recesses 83 formed at the lower end or tappet end of the valve stem. It will be apparent to one skilled in the art that to position or remove the lock elements 80 and 81 it will be necessary to first shift the spring retainer 71 vertically of the valve stem 76 so that the lock elements 80—81 are free to be moved outwardly or exploded from their seats or recesses.

In the operation and use of this device, the arm 28 which carries at its outer end the valve spring supporting structure 44—46 is moved to its inner upper position by turning the hand screw 30 clockwise, this operation as the result of the movement of the hand screw 30 being more clearly shown in Fig. 9. With the spring lifter arm 28 in its upper position the plates 46 are inserted under the spring supporting plate or washer 71 and the screw 12 is adjusted by operation of the handle 14 until it engages a slight recess normally to be found in the center of the upper face of the valve 85. It is to be remembered that the lever 6 during the positioning of the apparatus is in its upper position, i. e. the top full line position illustrated in Fig. 1. This adjustment is a permanent one which can be utilized in any valve in the same motor or same type of motor.

With the parts positioned as above described the lever 6 is moved downwardly to engage beneath the upper stop lug 22 projecting laterally from the side face of the upper arm 2 of the C-frame. The movement of the lever 6 below the stop lug 22 causes an expansion of the C-frame as shown in dotted line at T in Fig. 1, placing the C-frame under tension and applying pressure to the bottom of the spring support tending to lift the latter and compress the spring. Normally the parts at the bottom of the spring, including the split nut 80—81 are corroded and locked against any movement resulting from the application of pressure by tensioning the frame by movement of the arm 6 beneath the stop lug 22. With the frame under tension a sharp blow is applied to the upper end of the screw 12 as by a hammer indicated at H. The shock of the impact from the blow of the hammer H releases the corroded assembly at the base of the spring, including the split nut 80—81 and causes a swinging, partially rotary motion of the C-frame on the pivot 15 provided by the lower end of the screw on top of the valve. This movement of the C-frame is indicated by the reference character R and is intended to show approximately the movement of the C-frame as the arm 28, under release of the tension, follows the released spring base assembly in its movement up the valve stem. At this point the spring 75 is obviously partially compressed and the lock nut sections 80—81 are free but not released from the pocket in the base of the spring supporting washer 71. The lever 6 should now be swung to its lower position below the bottom stop lug 21, this movement swinging the C-frame, with screw point 15 as its pivot, and urging the spring to a compressed position such as is shown in Fig. 2. It will be noted in Fig. 2 that the tension in the C-frame is substantially released and the energy of the tensioned C-frame has been utilized in compressing the spring 75. In the position shown in Fig. 2 it will be apparent that the nut sections 80—81 are fully exposed and free to be removed and the removal of these split nut sections 80—81 will permit the spring parts to be removed from the valve stem.

The lever 6 can now be released to the full line position shown in Fig. 1, this release of the lever freeing the valve spring 75 from compression and permitting removal of the apparatus from the valve and the removal of the valve and its parts. After the preceding operation the other valves of the engine set, or from similar engines, can be removed without further adjustment of the screws.

Figure 4:
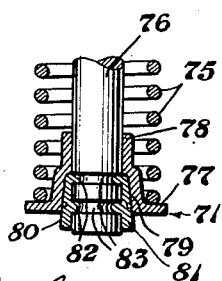
Fig. 4 is a fragmentary vertical sectional view showing the structure of the lower end of an automotive valve stem with the relation of the spring, the spring seat and the lock.
Figure 6:
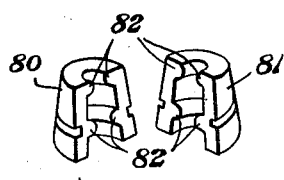
Fig. 6 is a perspective view showing the spring lock sections.
Figure 5:
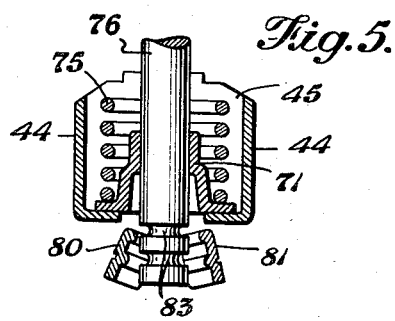
Fig. 5 is a vertical sectional view through the valve spring structure showing this structure shifted to the upper position with the spring lock released and exploded.

In replacing the spring assembly the operation requires no further adjustment of the screw 12. The valve spring support at the end of the arm 28 is inserted under the spring supporting washer 71 and the screw 12 is positioned centrally of the top of the valve 85. With the apparatus so positioned the lever 6 is lowered beneath the stop lug 21 which compresses the spring and permits the positioning of the split lock nut 80—81 in the bottom recesses 83 at the lower end of the valve stem 76. With the split nut 80—81 in position, the hand screw 30 is now adjusted downward this movement lowering the arm 28. The lowering of the arm 28 permits the supporting washer 71 to move downwardly over the lock nut sections 80—81 to retain these parts in position as shown in Fig. 4. It will be appreciated that the positioning of the locking elements 80—81 in an L-head type engine, as illustrated, requires that the operator's head be in position to see what he is doing, and that after he has assembled these elements, he must hold them with one hand while then lowering the valve spring retaining cup 71 so as to retain them. By provision of the adjustable arm 28 and its conveniently located and sensitive adjustment screw 30, the operator can readily lower the valve spring cup 71 with the light finger action of his free hand while remaining in the same position. To release the clamping arm 6 requires two hands if one is to avoid the risk of pulling the clamp off, and to release the tension sufficiently by turning the screw 12 would mean reaching up to the top of the C-frame to turn the handle 14, which again would tend to twist the clamp out of position if done with one hand. Besides, even if this could be accomplished with one hand without dislodging the clamp, the device would have to be reset for operation on succeeding valves. It will be appreciated that considerable stresses are involved when compressing automotive valve springs and means which reduces the risk of having one's fingers seriously pinched due to dislodgement of the clamp when holding the locking elements in place is herein provided.

When the supporting washer 71 has been sufficiently lowered by the counter-clockwise movement of the hand screw 30 to secure the sections of the lock nut 80—81 in position the apparatus can be removed by releasing of the arm 6 from beneath the stop 21. Before the next spring assembly is positioned, the arm 28 is again adjusted to its upper position by turning screw 30. It will be noted that the arm 28, when in its upper position, is inclined inwardly with respect to the legs of the C-frame so that when the clamp is under a stress tending to spread the legs, the spring support platform 46 will not be tilted outwardly so as to introduce the hazard of having the spring slip off. As the arm is lowered, however, and the stress on the C-frame is thereby released, the arm 28 and platform 26 approach parallelism with the lower leg. It is to be further noted that convenient removal and assembly of the spring engaging arm 28 is provided for in the foregoing arrangement and is accomplished by merely turning the screw 30 outward sufficiently to permit the arm 28 to be slid into or out of position. This, of course, is of particular advantage when it is desired to substitute special valve spring engaging arms such as are shown in Fig. 10.

What I claim is:

1. In a valve spring lifter including a C-frame, a valve engaging member carried by the outer end portion of the upper arm of the C-frame, and a valve spring supporting arm carried by the lower arm of said C-frame, said valve spring supporting arm having at its end a detachable spring engaging element, said supporting arm being formed at its outer extremity with a hook portion and said spring engaging element including a rear wall formed with a projection for engaging said hook, vertical spaced side walls, and inwardly extending spaced wing portions for engaging the spring.

2. The substance of claim 1 characterized in that the arm member is provided with a spring clip for locking the spring engaging element to the arm.

3. The substance of claim 1 characterized in that the arm is provided with a spring member, which spring member is secured to the bottom of said arm and is wrapped about the rear wall of said spring engaging member and overlies the upper portion thereof to provide a securing means for locking the parts in detachable association.

4. In a valve lifter, a C-frame having an upper horizontal leg which projects beyond the lower horizontal leg of the frame and supports at its end for vertical sliding movement a valve engaging element, a vertically adjustable member on said element, and clamping structure comprising means operatively connected to said member and to said upper C-frame leg for moving said element up and down with respect to said upper C-frame leg and for releasably holding it in a down position, said lower horizontal leg having an inclined surface formed at its outer end, which surface extends upwardly and inwardly with respect to the C-frame, a valve engaging arm adjustably supported on said lower leg, said arm extending outwardly and inwardly from the end of said lower horizontal leg to outer and inner arm ends respectively and having a follower member thereon intermediate of its ends which slidably engages said inclined surface, said outer end of said arm being arranged to engage a valve spring and said inner end of said arm having a wedge portion comprising opposite wedge surfaces which converge longitudinally inward of said arm from its inner end in a vertical plane, a pair of opposed wedge engaging elements supported on said lower leg inwardly of its end and arranged to oppositely engage said wedge, thereby to prevent longitudinal movement of said wedge in an outward direction with respect to said lower leg, and one of said wedge engaging elements being adjustable toward and away from the other so as to cause the longitudinal sliding of said wedge and arm portion with respect to said lower leg, and so as to cause said arm to be swung in a sliding and rotating motion about its inner end in a path determined by said inclined surface, whereby the outer valve spring engaging end is adjusted toward and away from said valve engaging element.

5. In a valve lifter, a C-frame having an upper horizontal leg which projects beyond the lower horizontal leg of the frame and slidably supports at its end for vertical sliding movement a valve engaging element, a member mounted for vertical adjustment on said element, and clamping structure comprising means operatively connected to said member and to said upper C-frame leg for moving said element up and down with respect to said upper C-frame leg and for releasably holding it in a down position, a valve spring engaging arm adjustably supported on said lower leg and extending outwardly from the end thereof to an outer end for engaging a valve spring, said arm also extending inwardly of the end of said lower leg and having a wedge portion at its inner end, said wedge portion comprising opposed upper and lower wedge surfaces which converge longitudinally inward of said arm from its inner end, an upper and a lower wedge engaging element supported on said lower leg at a point inwardly from its end and arranged for opposed engagement of said wedge so as to limit the longitudinal movement of said wedge and said arm outwardly with respect to said lower leg, an inclined surface formed at the end of said lower leg, which surface extends inwardly and upwardly with respect to said C-frame, and a follower element on said arm intermediate of its ends for engaging said inclined surface, said upper wedge engaging element being fixed and resisting rotation of said arm about the point of contact of its follower with said inclined surface due to a downward valve spring force acting at the outer end of said arm, and said lower wedge engaging element comprising a vertically adjustable thumb screw for controlling the outward and downward movement of said arm.

6. In a valve lifter, a C-frame having an upper horizontal leg which projects beyond the lower horizontal leg of the C-frame and slidably supports at its end for vertical sliding movement a valve engaging element, a member mounted for vertical adjustment on said element, and clamping structure comprising means operatively connected to said member and to said upper leg for moving said element up and down with respect to said upper C-frame leg and for releasably holding it in a down position, said lower horizontal C-frame leg having an inclined surface at its outer end, which surface extends in an upward and inward direction with respect to the C-frame, a valve engaging arm adjustably supported on said lower leg, said arm extending outwardly and inwardly from the end of said leg, a follower member on said arm intermediate of its ends engaging said inclined surface, a wedge portion formed at the inwardly extending end of said arm comprising upper and lower opposed wedge surfaces which converge longitudinally inward of said arm from its inner end, an upper and a lower wedge engaging element supported on said lower leg inwardly of its end and arranged for opposed engagement of said wedge, thereby to restrain outward longitudinal movement of said wedge and arm with respect to said lower leg, one of said wedge engaging elements comprising a thumb screw arranged for vertical adjustment whereby inward adjustment of said thumb screw with respect to said wedge imparts inward sliding movement to said wedge with respect to said lower leg and consequently causes the upward swing of the outer end of said arm about said wedge portion due to the sliding engagement of said follower with said inclined surface, stop means for limiting the downward swing of said arm to a point wherein it is substantially parallel with said lower leg, whereby as said arm is swung upwardly it will be inwardly inclined with respect to said C-frame legs, stop means for limiting the upward swing of said arm, and the longitudinal center line of said wedge portion being at such angle to a line passing through the points of contact of said wedge engaging elements when said arm is in a downward position that a substantial rotational as well as inward sliding force is applied to said wedge portion by inward adjustment of said thumb screw throughout the range of swing of said arm.

References Cited in the file of this patent

UNITED STATES PATENTS

| Number | Name | Date |
|---|---|---|
| 423,544 | Vanderman | Mar. 18, 1890 |
| 1,530,302 | Cook | Mar. 17, 1925 |
| 1,623,752 | Rainey | Apr. 5, 1927 |
| 1,636,046 | Daniels | July 19, 1927 |
| 1,982,838 | Sunnen | Dec. 4, 1934 |
| 2,004,590 | Sunnen | June 11, 1935 |
| 2,345,443 | Aiken | Mar. 28, 1944 |